(12) United States Patent
Fagala

(10) Patent No.: US 6,941,926 B2
(45) Date of Patent: Sep. 13, 2005

(54) AIR INTAKE SYSTEM FOR AN INTERNAL COMBUSTION ENGINE

(76) Inventor: Jeffrey A. Fagala, 702 Horizon Dr., Murphy, TX (US) 75094

( * ) Notice: Subject to any disclaimer, the term of this patent is extended or adjusted under 35 U.S.C. 154(b) by 0 days.

(21) Appl. No.: 10/760,329

(22) Filed: Jan. 20, 2004

(65) Prior Publication Data

US 2005/0045139 A1 Mar. 3, 2005

Related U.S. Application Data

(60) Provisional application No. 60/498,165, filed on Aug. 25, 2003.

(51) Int. Cl.⁷ ............................................. F02M 35/104
(52) U.S. Cl. ....................... 123/336; 123/470; 123/566; 123/184.53
(58) Field of Search ........................ 123/184.48, 184.56, 123/336, 184.53, 559.1, 566, 470, 445; 180/68.3

(56) References Cited

U.S. PATENT DOCUMENTS

| | | | |
|---|---|---|---|
| 2,184,918 A | 12/1939 | Kowitt ........................ 123/119 |
| 2,267,706 A | 12/1941 | Baile et al. .................... 183/21 |
| 2,388,213 A | 10/1945 | Mock .......................... 123/122 |
| 3,757,751 A | 9/1973 | Kitchin et al. ............... 123/119 |
| 4,058,096 A | 11/1977 | Brown ........................ 123/119 |
| 4,294,205 A | * 10/1981 | Iiyama et al. ................ 123/274 |
| 4,772,299 A | 9/1988 | Bogusz ......................... 55/385 |
| D340,513 S | 10/1993 | Stahel, II et al. .......... D23/364 |
| 6,463,901 B1 | 10/2002 | Cuddihee, Sr. et al. . 123/184.21 |

* cited by examiner

*Primary Examiner*—Andrew M. Dolinar
*Assistant Examiner*—Katrina B. Harris
(74) *Attorney, Agent, or Firm*—Stephen S. Mosher; Charles D. Gunter, Jr.

(57) ABSTRACT

There is disclosed herein an improved air and fuel intake system for a high performance internal combustion engine for installing on a supercharger or the intake manifold of the engine. The air intake system is attached to the mounting surface of the supercharger or intake manifold such that the plurality of separate air passages of the intake system ensure the uniform distribution of intake air to all parts of the supercharger or intake manifold. Each air passage has a decreasing cross-sectional area along the direction of air flow to increase the velocity of the intake air. The air intake system includes a forwardly disposed air inlet, which faces in the direction of travel of a vehicle powered by the engine. The air passages are controlled by butterfly air valves in the air inlet.

11 Claims, 3 Drawing Sheets

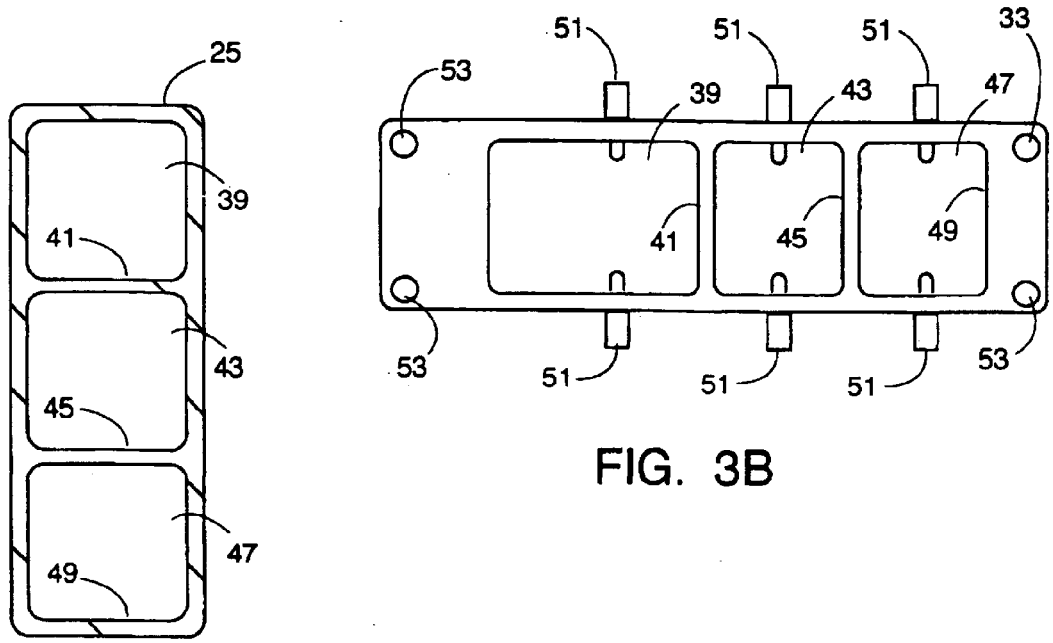
FIG. 3A
FIG. 3B
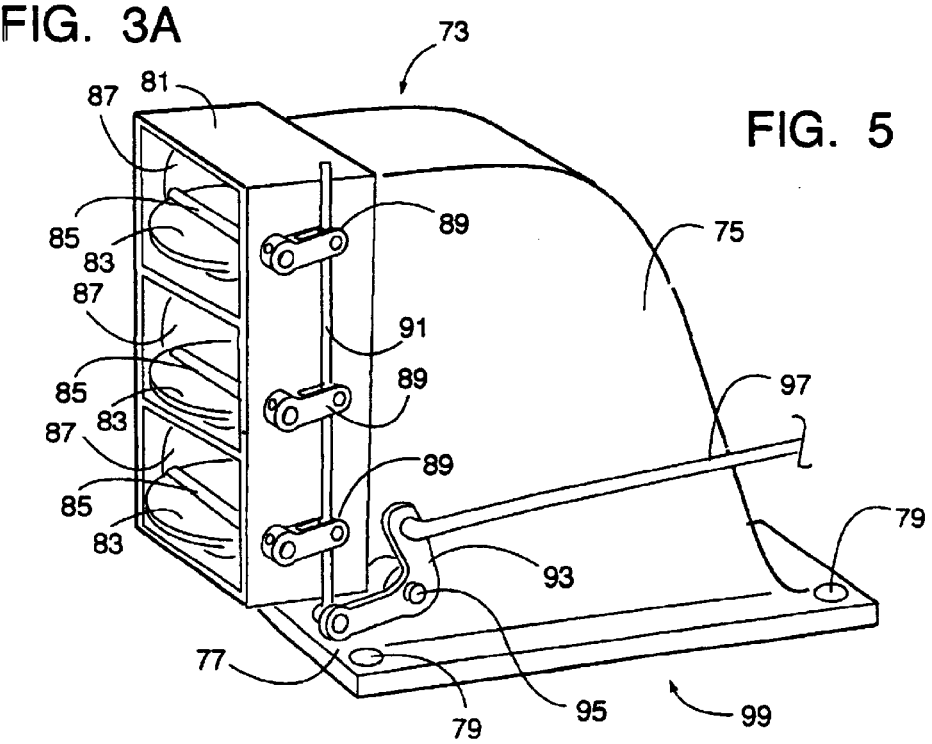
FIG. 5

AIR INTAKE SYSTEM FOR AN INTERNAL COMBUSTION ENGINE

CROSS REFERENCE TO RELATED APPLICATIONS

The present application claims priority from provisional application Ser. No. 60/498,165, filed Aug. 25, 2003, having the same title and by the same inventor.

BACKGROUND OF THE INVENTION

1. Field of the Invention

The present invention generally relates to air intake systems for internal combustion engines and more particularly to an air intake apparatus for high performance internal combustion engines having an improved flow of air to maximize induction of air-fuel mixture into the engine.

2. Description of the Prior Art

The air intake of an internal combustion engine is a critical part of the engine system. The power output of the engine varies in proportion to the volume of air that can be taken in by the engine per unit time. The volume of air that can be taken in by the engine further depends on the absence of (1) obstructions to the flow of air; (2) uneven distribution of the air flow; and (3) any factor which would reduce the velocity of the flow of air.

In the prior art, one device disclosed in U.S. Pat. No. 2,267,706, issued to Baile et al., teaches a horizontal intake and a relatively long vertically oriented intake runner in a spiral configuration and having a decreasing cross-sectional area. Another prior art device, disclosed in U.S. Pat. No. 2,388,213, issued to Mock, teaches a substantially horizontal intake leading through an approximately right angle bend to a relatively short vertical runner and having an "island" baffle disposed in the airflow path within the region of the right angle bend to control the velocity of inducted air.

In yet another example, the prior art air scoop 17 shown in FIG. 1 for a racing engine assembly 11 encloses the intake port area of a Roots-type supercharger 15. The air scoop 17 is mounted on the air inlet mounting flange 19 of the supercharger 15, which in turn is mounted on an intake manifold portion of the engine block 13 of the engine assembly 11. The inlet portion of the scoop essentially duplicates the cross-sectional area of the intake opening into the supercharger, and couples it with an air chamber to a position facing the direction of travel of the racing vehicle, e.g., a drag racing vehicle or tractor pull vehicle, in order to collect the air to be inducted into the supercharger and the engine. The flow of air is controlled with a system of butterfly valves 21, typically coupled to the throttle linkage (not shown) of the engine 11. As the vehicle gains speed, the forward motion of the vehicle forces more air into the inlet portion of the air scoop to supply the increased demand for air needed to increase the power of the engine.

These prior art scoops have the disadvantage of restricting the air flow into the engine because of one or more of the following impairments: (1) the relatively sharp bends in the intake air passages; (2) the lack of directed passages to guide the flow of air into the supercharger air intake; (3) the liklihood of an uneven distribution of air; or (4) the relatively long and circuitous air passages, especially in the higher RPM ranges where an engine's power output and need for air tends to be greatest. What is needed is a less obstructive, more uniform and higher velocity air flow path into the engine, which provides an increased air intake volume. Moreover, an improved air intake system should also be no more complex or costly to manufacture and should preferably be a 'bolt-on' modification requiring minimal additional changes to the engine. An ancillary benefit would result if an improved design also permits utilizing ram effects at speed to increase the intake air volume.

SUMMARY OF THE INVENTION

Accordingly, there is disclosed herein an improved air and fuel intake system for a high performance internal combustion engine for installing on a supercharger or the intake manifold of the engine. The air intake system is attached to the mounting surface of the supercharger or intake manifold such that the air passages of the intake system are in corresponding alignment with of the air inlet openings in the mounting surface or manifold. The air intake system includes a forwardly disposed air inlet, which faces in the direction of travel of a vehicle powered by the engine. One or more air passages lead directly from the air inlet toward and correspond respectively to the one or more air inlet openings in the manifold, wherein each air passage has a decreasing cross-sectional area along the direction of air flow. In another aspect, the air passages are substantially vertical in orientation with a minimum of bends in each passage to direct intake air directly into the air inlet openings of the manifold.

In another aspect of the invention the air intake is controlled by butterfly valves disposed on and operated by a common shaft. In yet another aspect of the invention the air intake is controlled by individual butterfly valves disposed on and operated by separate shafts. The butterfly valve shafts may be actuated by mechanical linkages or solenoid operated linkages or the like.

BRIEF DESCRIPTION OF THE DRAWINGS

FIG. 3A illustrates a view of the cross-section of the air intake body 25 at section A—A of FIG. 3;

FIG. 3B illustrates a view toward the air inlet of the air intake body of FIG. 3;

FIG. 5 illustrates another embodiment of the air intake system of the present invention having circular air control butterfly valves mounted on and operated by separate shafts coupled to a portion of an actuating linkage.

DETAILED DESCRIPTION OF THE INVENTION

Figure 2:
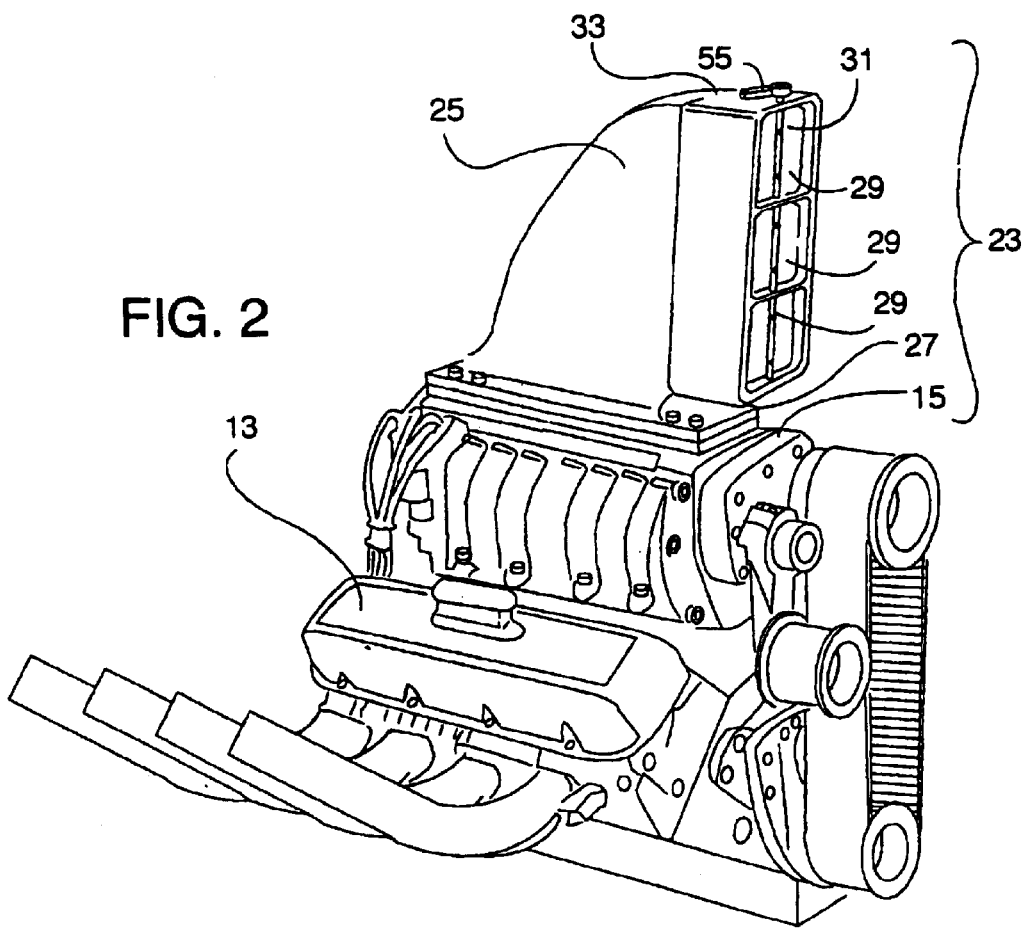
FIG. 2 illustrates one embodiment of an air intake system installed on a supercharged racing engine according to the present invention, the air intake system having air control butterfly valves mounted on and operated by a common shaft.

Referring to FIG. 2, there is illustrated a racing engine 13 equipped with a supercharger 15 and one embodiment of the air intake system 23 of the present invention. In the description that follows, the 'air intake system' of the present invention may also be known as an 'injector' or an 'injector hat.' The air intake system 23 includes an air inlet body portion 25 (also termed an air inlet body 25) mounted to the intake port 27 of the supercharger 15 and one or more butterfly-type air valves 29 installed in an air valve housing 33 of the air intake system 23. In the illustrative embodiment, the butterfly air valves 29 are mounted on and operated by a common air valve shaft 31. Although a butterfly-type air valve is shown in the accompanying drawings, other types of air valve arrangements may be adapted to the present invention. The air valve shaft 31 is supported within the air valve housing 33. As will be described herein below, the air valve shaft 31 may be actuated by a linkage (not shown in FIG. 2) coupled to the throttle of the engine 13.

The air intake system 23 shown in FIG. 2 in effect tilts or transposes the intake port (not shown) of the supercharger upward and forward approximately 90 degrees so that its full intake port area faces directly into the incoming air flow. In the embodiment shown, the inlet portions of the air intake passages are vertically disposed, one above the other, which mimics the arrangement of the inlet ports of the supercharger, as though they were tilted forward. This arrangement also minimizes the amount and severity of bending of the air passages within the air intake system, which minimizes any impairment to air flow. Further, the air inlet controlled by the butterfly air valves 29 may be enlarged beyond the intake port area of the supercharger to increase the effective cross-sectional area of the intake port of the supercharger. As will be described herein below, this increase in cross-sectional area at the inlet to the air inlet housing is utilized in conjunction with an ever-decreasing cross-sectional area of the air passages within the air intake system of the present invention to achieve a greater velocity of incoming air flow into the supercharger.

The air intake system 23 of the present invention provides a system of several tube-like air intake passages to divide the incoming air into several equal parts for conducting air to a respective portion of the air intake port of the supercharger. The provision of several substantially similar passages enables the uniform distribution of air inducted into the engine. Further, each passage inlet may have a butterfly or other air valve to control the air induction. Moreover, each passage provides an ever-decreasing cross-sectional area to increase the air velocity in the passage of the air into the engine.

The inlets of the air passages may be preferably arranged vertically, one above the other, as shown in FIG. 2. Alternatively, the inlets of the air passages may be arranged in another configuration, as long as (1) the passages each provide substantially equal amounts of air flowing directly into a corresponding portion of the air intake port of the supercharger, (2) the air passages have no sharp bends or other restrictions to air flow, and (3) the air passages have an ever-decreasing cross-sectional area in the direction of the air flow into the supercharger. For example, in some applications requiring a lower overall profile of the engine/supercharger/injector combination, the air passage air inlets may be configured to approximate a more side-by-side relationship in a lower profile without departing from the principles of the present invention. It will be appreciated that, in such lower profile configurations the air passages may be curved somewhat more than in the illustrative embodiment of FIG. 2, or may also have some variation in the shape of their cross-section to couple the air inlets to the supercharger ports.

In some embodiments of the air intake system 23 of the present invention the internal passages of the air inlet body 25 may have a rectangular cross-section as shown in the figures herein. Other embodiments may employ circular or ovoid cross-sections depending on the application. The butterfly air valves 29 may have the same shape as the internal passages or, in some cases may not be the same shape. For example, the butterfly valves 29 may be rectangular and lead through, e.g., a transition passage into passages having a circular cross-section. Passages inside the body 25 of the air intake system 23, whether rectangular or of another shape, are configured to gradually decrease the cross-sectional area of each passage by approximately ten to fifty percent, in some typical applications, from that of the butterfly air valve 29 in the air inlet to the cross-sectional area at the outlet of the air inlet body 25 that matches the intake port 27 of the supercharger or other manifold structure of the engine. In the illustrative example shown in FIGS. 2 through 5, the reduction in cross-sectional area is approximately 17%.

The amount of decrease in the cross-sectional area of the air passages is determined in large part by three factors: (1) the maximum air intake cross-sectional area that may be permitted by the rules of the competitive sanctioning organization; (2) the size of the air inlet port of the supercharger (or intake manifold of the engine if a supercharger is not used); and (3) the need to keep the individual air passages as short as possible. The decreasing cross-sectional area of the passages forces the inducted air to occupy a smaller volume, thus compressing the air and increasing its' density and velocity. Moreover, as the speed of the racing vehicle increases, more air is forced into the air inlet and compressed as it is forced through the air intake system 23. The body 25 is also configured to minimize the length of the intake passages and to minimize the number and angle of bends in the paths through the passages. These features together enable a greater volume of air to be mixed with proportionately more fuel, which increases the power output of the engine.

The air intake system of the present invention may be effectively used on supercharged or unsupercharged (normally aspirated) engines, and with engines utilizing fuel injectors or carburetors disposed on the top of the engine. For example, in normally aspirated engine applications, the air intake system of the present invention may be mounted on or coupled to an intake manifold having intake ports leading to the cylinders of the engine through ports in the cylinder heads of the engine. In this discussion, it will be understood that an intake manifold can be any structure that has passages for conveying air or an air/fuel mixture to the intake ports leading to the engine cylinders. An intake manifold may include one or more carburetors or fuel injection ports for metering fuel into the incoming air stream in the correct proportions. In other applications the air intake system of the present invention may be mounted directly on the cylinder heads wherein the air passages of the air intake system couple directly into the intake ports of the cylinder heads of the engine. The present invention may thus be advantageously adapted to a variety of similar applications because of the ease with which the air intake system 23 may be coupled to the intake ports in the cylinder heads of the engine 13.

Figure 3:
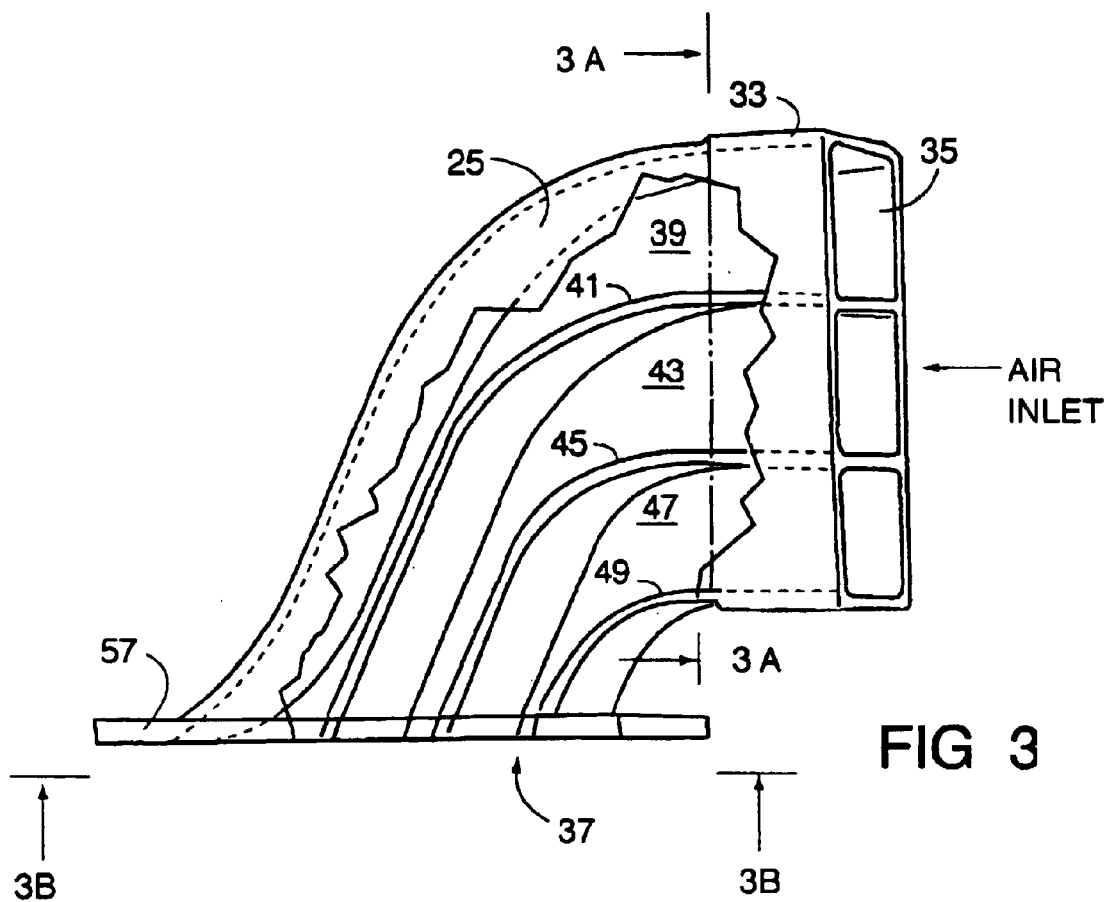
FIG. 3 illustrates a cutaway view of the air intake body showing the internal air passages of the air intake system according to the present invention.

Referring to FIG. 3, there is illustrated a cutaway view of one embodiment of the air inlet body 25 having an air valve housing 33, an air inlet 35, air outlet port 37 and internal air passages 39, 43 and 47, and a base 57 of the air intake system according to the present invention. It will be appreciated by persons skilled in the art that the configuration of the internal air passages of the air inlet body 25 provides a substantially uniform distribution of air into the entire intake port area of the supercharger or intake manifold to which the air intake body 25 is attached. This is in contrast to the prior art air inlet devices, which tend to force most of the air toward the rear of the intake chamber or otherwise provide an uneven distribution of air flow into the supercharger. The uneven distribution of air in the prior art devices unnecessarily limits the maximum horsepower output of the engine.

Although the illustrative embodiment includes three internal air passages (39, 43 and 47), the invention is not limited to three. Generally, the choice of the number of air passages is dependent upon the need to control the distribution of air (by dividing the air flow into separate passages, which convey approximately equal volumes of air into the engine) or the particular control functionality desired. For Example, if progressive actuation of the air valve(s) is desired, two or more air passages and associated air valves would be considered wherein one valve opens first or opens at a faster rate than the next valve. The air intake body 25 shown in FIG. 3, including the air valve housing 33 and the passage walls 41, 45 and 49, and even the base 57 may be fabricated as a single assembly of metal, plastic or composite materials, for example. Various processes including casting, molding, or built-up fabrication using pieces cut to size and assembled with adhesives or other fasteners or by welding, etc., may be used to fabricate the air inlet body 25. Important features of the construction include the strength, light weight and durability of the materials used and dimensional accuracy, the shape of the passages and airtight seams and joints, as will be readily appreciated by persons skilled in the industrial arts.

Referring to FIG. 3A, there is illustrated a view of the cross-section of the air intake body 25 at section 3A—3A of FIG. 3. Shown in this figure are the air passages 39, 43 and 47 formed by the passage walls 41, 45 and 49 respectively.

Referring to FIG. 3B, there is illustrated a view toward the air outlet port 37 provided in the base 57 of the body 25 of the air intake system of the present invention shown in FIG. 3. Shown in this figure are the air passages 39, 43 and 47 formed by the passage walls 41, 45 and 49 respectively. In the illustrative embodiment, injection nozzles 51 are shown at six locations in the base 57 to introduce fuel into both sides of the air streams exiting each passage of the air outlet port 37 (See FIGS. 3 and 4). The air intake body 25 is secured to the intake mounting surface of the supercharger or intake manifold using screws inserted through holes 53 in the base 57 at the four locations shown. A gasket (not shown) may be used between the base 57 of the air intake body and the intake mounting surface of the supercharger or intake manifold to provide an air tight joint.

Figure 4:
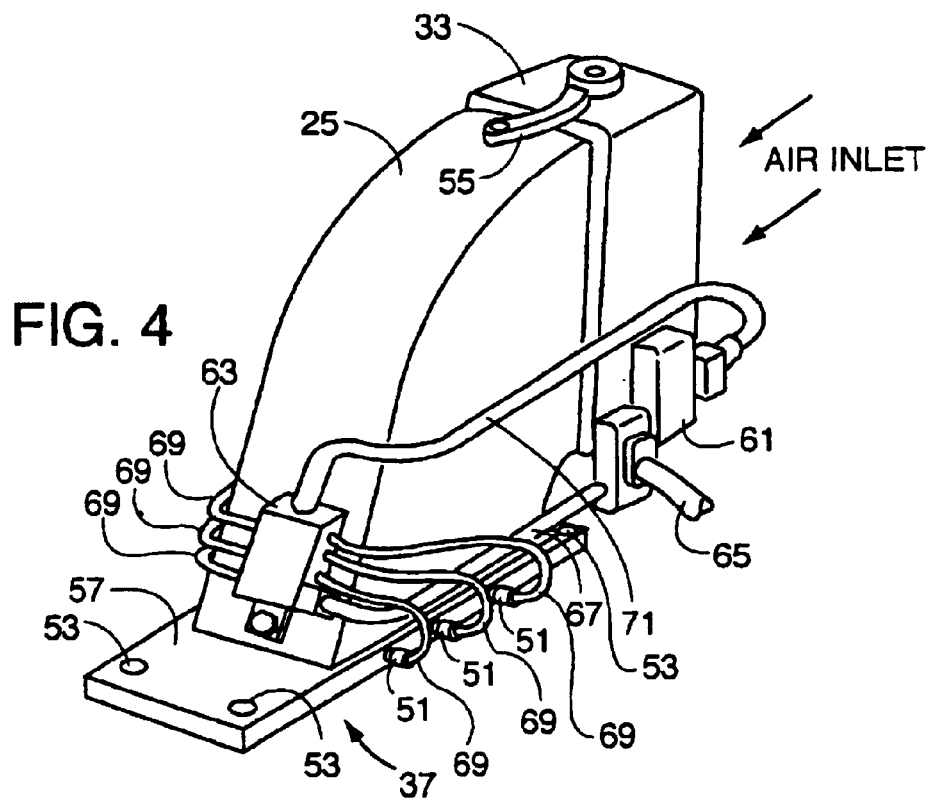
FIG. 4 illustrates an elevated perspective view from the rear of one embodiment of the air intake system according to the present invention with details of the fuel line system shown thereon.

Referring to FIG. 4, there is illustrated an elevated perspective view from the rear of one embodiment of the air intake system 23 according to the present invention with details of one configuration of the fuel lines shown thereon. The air intake system 23 includes the air intake body 25, air inlet housing 33 having a butterfly shaft arm 55 and a base 57. The butterfly shaft arm 55 is provided for attaching to actuating linkage (not shown) to control the position of the butterfly air valves, which in turn controls the amount of air admitted into the air intake system 23. The base 57 includes mounting holes 53 for installing the air intake system 23 on the mounting surface of the supercharger or intake manifold.

Attached to the air intake body 25 of FIG. 4 is a fuel metering valve 61, known in the art as a "barrel valve," and a fuel distribution block 63. The fuel system used in the illustrative example is known in the art as a "constant spray" system. An inlet fuel line 65 provides fuel to the "barrel" metering valve 61, generally from a fuel pump (not shown) driven by the engine. Fuel is metered through a fuel distribution line 67 to the distribution block 63. Fuel is then distributed through individual secondary fuel lines 69 to each injection nozzle 51. There may be one or more injection nozzles, the number and location being determined by the particular application. One typical configuration places one injection nozzle 51 on each side of each air intake passage outlet port. Other applications may require only one injection nozzle 51 for each air intake passage outlet port.

Continuing with FIG. 4, a bypass fuel line 71 returns excess fuel to a section of the metering valve 61 called the pump control poppet valve in the event that the butterfly air valves are suddenly closed to an idle position. This is a safety feature to prevent pumping raw fuel into the engine when it is not needed. Control for the fuel metering valve 61 is provided by directly linking the rotation of a spool valve within the barrel valve 61 to the rotation of the butterfly air valve shaft, both of which may be operated by the engine throttle. Both the spool of the barrel valve 61 and the shaft 31 of the butterfly valves 29 may be attached to individual crank arms (such as crank arm 55), which in turn may be coupled together by an adjustable-length link. Although not shown in FIG. 4, these crank arms and the link between them may be located just below the air inlet housing 33. When the throttle opens the butterfly air valves by a certain amount, the barrel valve 61 is also opened by a corresponding amount, together admitting both air and fuel in the correct proportion to the engine.

FIG. 5 illustrates another embodiment of the air intake system of the present invention having circular butterfly air valves mounted on and operated by separate shafts coupled to a portion of an actuating linkage. The air intake system 73 includes an air inlet body 75 mounted to a base 77 having mounting holes 79 for securing the air intake system 73 to the intake mounting surface of a supercharger or intake manifold. The front portion of the air inlet body 75 includes a butterfly air valve housing 81 equipped with three circular butterfly air valves 83, each mounted on and actuated by individual shafts 85. Each circular butterfly air valve 83 controls air flow into a passage 87 through the air inlet body 75 to the air outlet 99 from below the air intake system.

Continuing with FIG. 5, each butterfly valve shaft 85 is connected through a hole in the butterfly valve housing 81 to a butterfly shaft arm 89. Each butterfly shaft arm 89 is coupled to an actuating link 91, which is connected to a first arm of a bell crank 93. The bell crank 93 pivots on a pivot bushing 95. The second arm of bell crank 93 is connected to an end of the throttle linkage 97. In operation, as the throttle linkage 97 is moved to the left in FIG. 5, the butterfly air valves 83 are caused to open, admitting more air into the passages 87 of the air intake system 73. Moving the throttle linkage 97 to the right in the figure operates to close the butterfly air valves 83 and admit less air into the passages 87. The coupling of the butterfly shaft arms 89 to the actuating link 91 may be fixed, thus operating all of the butterfly air valves 83 together. Alternatively, an adjustable collar (not shown) may be installed on the actuating link 91 near a selected butterfly shaft arm 89 so as to delay the opening of a selected butterfly air valve 83 by allowing the actuating link 91 to slide through a bore in the end of a selected butterfly shaft arm 89 until it contacts the collar. At the time of contact the selected butterfly air valve 83 will begin to open with further movement of the actuating link 91. The rate of opening of a specified butterfly air valve 83 may be adjusted by varying the length of the butterfly shaft arm 89 corresponding to the specified butterfly. In this way the opening of the butterfly air valves may be adjusted to operate in a progressive fashion to meet the airflow demands of a particular application.

Figure 1:
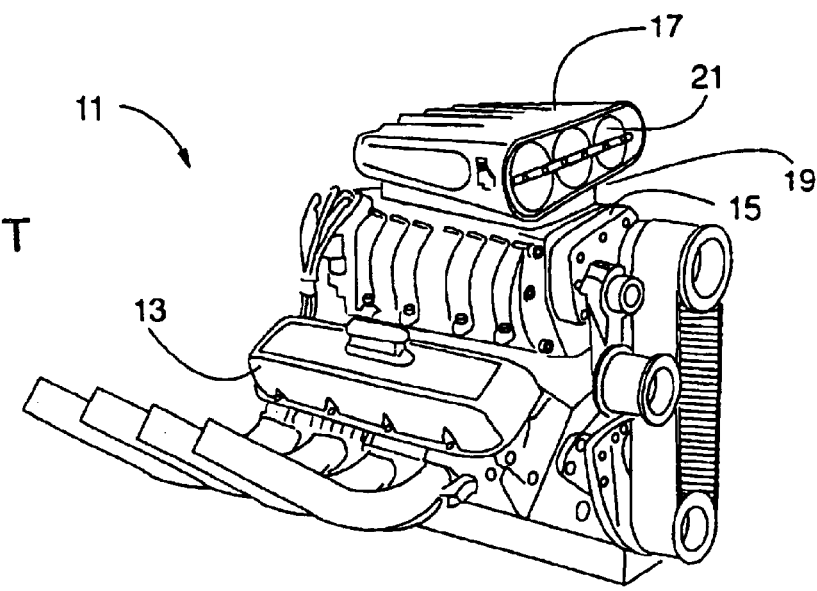
FIG. 1 illustrates an example of a prior art air scoop installed on a supercharged racing engine.

In order to test the performance of Applicant's air intake system, a 557 cubic inch Arias supercharged engine running on an alcohol fuel was installed on and connected to a commercial dynamometer. This is the type of engine which would typically be used in a competitive two wheel drive, tractor/trailer pull contest. In the first test run, a prior art air injector system with horizontally disposed air inlets (as shown in FIG. 1) and no vanes behind the butterfly was utilized. One example of such a prior art air injector is a "Buzzard" injector manufactured by the Enderle Fuel Injection Company of Simi Valley, Calif. Using this prior art injector, various engine readings were made by the dynamometer, as shown in Table I, which follows. The air intake system of the present invention was then installed on the same engine. The injector nozzles and main jet nozzles were removed from the prior art injector system and installed on the air intake system of the present invention. In this way, identical injector and main jet nozzles were utilized to give a fair comparison of the two systems. The total cross sectional area of the butterfly openings on each of the systems was also approximately the same so that an equal volume of air was initially presented to each system. Readings of the same parameters at the same data points were then made with the dynamometer on the air intake system of the invention. The results are given in Table II, which follows Table I.

TABLE I

| Speed rpm | CPower C_HP | C_TQ lb-ft | BLOWER psi | B-TEMP °F. | Oil-P250 PSI | Barom "Hg | C.A.T. °F. | RelHum % |
|---|---|---|---|---|---|---|---|---|
| 5000 | 1514 | 1591 | 29 | 105 | 84.5 | 30.32 | 61 | 28.9 |
| 5100 | 1545 | 1591 | 29.2 | 105 | 84.8 | 30.32 | 61 | 29 |
| 5200 | 1556 | 1572 | 29.3 | 105 | 85.1 | 30.32 | 61 | 29 |
| 5300 | 1560 | 1546 | 29.3 | 105 | 85.4 | 30.32 | 61 | 29.1 |
| 5400* | 1531 | 1489 | 29.2 | 106 | 85.8 | 30.31 | 61 | 29.2 |
| 5500* | 1515 | 1447 | 29.4 | 107 | 86.5 | 30.3 | 61 | 29.3 |
| 5600* | 1514 | 1420 | 29.6 | 107 | 87.3 | 30.31 | 61 | 29.3 |
| 5700* | 1501 | 1383 | 29.8 | 107 | 87.9 | 30.3 | 61 | 29.3 |
| 5800* | 1520 | 1376 | 30.3 | 107 | 88.5 | 30.3 | 61 | 29.3 |
| 5900* | 1553 | 1382 | 30.6 | 109 | 89.2 | 30.3 | 61 | 29.3 |
| 6000 | 1575 | 1379 | 30.8 | 109 | 89.8 | 30.3 | 61 | 29.3 |
| 6100 | 1577 | 1358 | 30.9 | 109 | 90.8 | 30.3 | 61 | 29.3 |
| 6200 | 1578 | 1337 | 31.4 | 110 | 91.3 | 30.3 | 61 | 29.3 |
| 6300 | 1590 | 1325 | 31.7 | 110 | 92.3 | 30.3 | 61 | 29.3 |
| 6400 | 1569 | 1287 | 32 | 111 | 93 | 30.3 | 61 | 29.3 |
| 6500 | 1552 | 1254 | 32.3 | 113 | 94.4 | 30.3 | 61 | 29.3 |
| 6600 | 1534 | 1220 | 32.4 | 113 | 96.1 | 30.3 | 61 | 29.3 |
| 6700 | 1441 | 1129 | 32.2 | 114 | 98.7 | 30.29 | 61 | 29.3 |
| 6800 | 1362 | 1052 | 32.4 | 115 | 101.2 | 30.3 | 62 | 29.3 |
| 6900 | 1345 | 1024 | 32.7 | 117 | 101.1 | 30.31 | 62 | 29.5 |
| 7000 | 1313 | 985.3 | 33.1 | 119 | 102 | 30.32 | 62 | 29.8 |
| Average data in * band | | | | | | | | |
| 5650 | 1522 | 1416 | 29.81 | 107.16 | 87.53 | 30.3 | 61 | 29.28 |

TABLE II

| Speed rpm | CPower C_HP | C_TQ lb-ft | BLOWER psi | B-TEMP °F. | Oil-P250 PSI | Barom "Hg | C.A.T. °F. | RelHum % |
|---|---|---|---|---|---|---|---|---|
| 5000 | 1530 | 1607 | 31 | 105 | 83.1 | 30.33 | 66 | 27.5 |
| 5100 | 1563 | 1610 | 31.1 | 107 | 82.7 | 30.34 | 66 | 27.5 |
| 5200 | 1591 | 1607 | 31.2 | 107 | 82.8 | 30.33 | 66 | 27.6 |
| 5300 | 1612 | 1597 | 31.3 | 107 | 83.1 | 30.33 | 66 | 27.8 |
| 5400* | 1632 | 1587 | 31.5 | 107 | 83.6 | 30.33 | 66 | 28 |
| 5500* | 1654 | 1580 | 31.9 | 107 | 84.1 | 30.34 | 66 | 28.2 |
| 5600* | 1669 | 1565 | 32.1 | 108 | 84.4 | 30.35 | 66 | 28.4 |
| 5700* | 1684 | 1552 | 32.3 | 109 | 85.2 | 30.34 | 66 | 28.6 |
| 5800* | 1680 | 1522 | 32.5 | 110 | 85.8 | 30.34 | 66 | 28.8 |
| 5900* | 1688 | 1503 | 32.7 | 110 | 86.4 | 30.34 | 67 | 29.1 |
| 6000 | 1697 | 1486 | 33 | 110 | 87 | 30.34 | 67 | 29.4 |
| 6100 | 1711 | 1473 | 33.2 | 110 | 87.7 | 30.35 | 67 | 29.6 |
| 6200 | 1742 | 1476 | 33.5 | 110 | 88.9 | 30.35 | 67 | 29.9 |
| 6300 | 1741 | 1451 | 33.6 | 112 | 90.1 | 30.35 | 67 | 30.2 |
| 6400 | 1735 | 1424 | 33.9 | 113 | 91.3 | 30.35 | 67 | 30.4 |
| 6500 | 1730 | 1398 | 34.2 | 114 | 92.4 | 30.35 | 67 | 30.7 |
| 6600 | 1746 | 1390 | 34.6 | 114 | 93.6 | 30.35 | 67 | 31 |
| 6700 | 1778 | 1394 | 35 | 114 | 95.2 | 30.33 | 68 | 31.2 |
| 6800 | 1790 | 1383 | 35.3 | 115 | 97.5 | 30.33 | 68 | 31.6 |
| 6900 | 1772 | 1349 | 35.7 | 116 | 98.7 | 30.34 | 68 | 31.8 |
| 7000 | 1773 | 1331 | 36.2 | 117 | 99.8 | 30.37 | 68 | 32.2 |

TABLE II-continued

| Speed rpm | CPower C_HP | C_TQ lb-ft | BLOWER psi | B-TEMP °F. | Oil-P250 PSI | Barom "Hg | C.A.T. °F. | RelHum % |
|---|---|---|---|---|---|---|---|---|
| | | | Average data in * band | | | | | |
| 5650 | 1667 | 1551 | 3216 | 108.5 | 84.91 | 30.33 | 66.16 | 28.51 |

An invention has been described having several advantages. As can be seen from Table I, approximately 1313 horsepower was achieved with the prior art air intake system at the maximum test RPM of 7000 RPM. As shown in Table II, using the air intake system of the present invention, 1773 horsepower was achieved with the horsepower continuing to climb, at the same 7000 RPM. This represents an increase of 460 horsepower using the air intake system of the invention, as compared with the power output of the same engine equipped with the prior art air intake system. Likewise, Applicant's system achieved 1331 pound-feet (lb-ft) of torque at 7000 RPM (see Table II) as compared to 985.3 pound-feet (lb-ft) of torque at 7000 RPM (see Table I) for the prior art system. The data also shows that the horsepower achieved in the prior art system peaked at about 6300 rpm and then rapidly fell off. The horsepower achieved never fell off in Applicant's trial run, but continued to climb to 7000 RPM, the upper limit of the tests.

The substantial improvement in power output provided by the present invention is believed to be caused by two mechanisms. First, the design of the air intake passages provides a uniform distribution of air to all parts of the air intake of the supercharger. No part of the air intake is starved for air as in the prior art air intake system. Such restriction of air is shown in the test data of Table I above to substantially limit the power output of the prior art configuration. Second, the ever-decreasing cross-sectional area of the air intake passages of the present invention, as the air travels from the inlet ports to the supercharger air intake port, provides an increased air velocity into the supercharger air intake. Both of these mechanisms, in effect, provide a greatly increased volume of air to be inducted into the supercharger (or, the intake manifold of a naturally aspirated engine), with a proportional increase in horsepower output as shown by the data of Table II above. In a typical tractor/trailer pull event, for example, a contestant might utilize four engines on the pull vehicle. The 460 horsepower increase per engine achieved by Applicant's system, when multiplied times four, would represent an 1840 horsepower increase, the practical equivalent of adding another engine without the attendant weight increase of the vehicle.

While the invention has been shown in only one of its forms, it is not thus limited but is susceptible to various changes and modifications without departing from the spirit thereof. For example, the shape, arrangement and number of air passages may be varied to suit a particular application while still embodying the principles of the present invention enumerated herein above. Similarly, the location and number of fuel nozzles may be varied according to the application and the specific fuel requirements of an individual application. Further, the arrangement of the air inlets, their shape, or the means used to control the induction of air thereinto may also be configured to suit the application without departing from the principles of the present invention. While butterfly valves are coupled to a throttle and used to control the amount of air and fuel used by the engine in the illustrative embodiment described herein above, other throttle mechanisms may be adapted to the air intake system of the present invention.

What is claimed is:

1. An intake system for an internal combustion engine, comprising:

an intake manifold of the internal combustion engine adapted to receiving an air intake system in alignment with one or more air intake port openings in a mounting surface of the intake manifold; and an air intake system having a plurality of forwardly disposed air inlets and a plurality of separate air passages leading from the air inlets toward the one or more air intake openings in the intake manifold;

wherein the distribution of air to all parts of the air intake openings in the intake manifold is substantially uniform; and wherein each air passage in the air intake system has an ever decreasing cross-sectional area along the direction of air flow.

2. The intake system of claim 1, wherein each of the separate air passages conveys a substantially equal volume of air therethrough.

3. The intake system of claim 1, wherein the internal combustion engine includes a supercharger installed between the air intake system and the intake manifold of the engine, the supercharger having one or more air intake port openings in a mounting surface for receiving the air intake system.

4. The intake system of claim 1, wherein the air intake system comprises:

a body portion including the air passages;

an air inlet housing attached to an inlet end of the body portion and including one or more air valves actuated by an actuating linkage to control air flow respectively into the plurality of air passages; and a base attached to an outlet end of the body portion for coupling an output port associated with each air passage into the intake manifold of the internal combustion engine.

5. The intake system of claim 4, wherein the air intake system further comprises:

at least one fuel nozzle coupled through the base near the output port of each of the plurality of air passages for introducing fuel into an air stream emitting from each output port of each air passage.

6. The intake system of claim 5, wherein the air intake system further comprises:

a fuel distribution network for supplying fuel to the at least one fuel nozzle corresponding to each air passage, wherein the supply of fuel to the nozzles is provided in cooperation with the actuation of the air valves for admitting air to be mixed with fuel as it is introduced into the internal combustion engine.

7. The intake system of claim 4, wherein the body, air inlet housing and base are all fabricated as a single assembly.

8. The intake system of claim 4, wherein the body, air inlet housing and base are cast as one piece.

9. The intake system of claim 4, wherein the air valve is a butterfly-type valve.

10. The intake system of claim 1, wherein the air inlets to the plurality of separate air passages are disposed one above the other at the air inlet housing.

11. The intake system of claim 4, wherein the air inlets to at least two of the plurality of separate air passages are disposed side-by-side at the air inlet housing to provide a lower profile.

* * * * *